United States Patent
Shao (10) Patent No.: US 12,452,097 B2
(45) Date of Patent: Oct. 21, 2025

(54) SIGNAL TRANSMISSION USING BACKSCATTER DEVICE IN WIRELESS COMMUNICATION

(71) Applicant: GUANGDONG OPPO MOBILE TELECOMMUNICATIONS CORP., LTD., Guangdong (CN)

(72) Inventor: Shuai Shao, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 433 days.

(21) Appl. No.: 18/063,681

(22) Filed: Dec. 8, 2022

(65) Prior Publication Data
US 2023/0107204 A1    Apr. 6, 2023

Related U.S. Application Data

(63) Continuation of application No. PCT/CN2020/095941, filed on Jun. 12, 2020.

(51) Int. Cl.
*H04L 12/28* (2006.01)
*H04W 72/04* (2023.01)

(52) U.S. Cl.
CPC ......... *H04L 12/2838* (2013.01); *H04W 72/04* (2013.01); *H04L 2012/2841* (2013.01)

(58) Field of Classification Search
CPC ....... H04L 12/2838; H04L 2012/2841; H04W 72/04; H04W 4/70; H04B 1/40; H04B 5/77; H04K 1/02; H04K 3/25; H04K 3/80; H04K 2203/18; H04K 2203/20; G06K 19/07336; G06K 7/10267
See application file for complete search history.

(56) References Cited

U.S. PATENT DOCUMENTS

| 2015/0237504 | A1* | 8/2015 | Xie | H04W 16/14 |
| | | | | 455/454 |
| 2021/0250868 | A1* | 8/2021 | Ma | H04B 1/38 |
| 2021/0250924 | A1* | 8/2021 | Ji | H04W 72/23 |
| 2021/0297994 | A1* | 9/2021 | Zhang | H04L 1/1819 |

(Continued)

FOREIGN PATENT DOCUMENTS

| CN | 108702763 | 10/2018 |
| CN | 109412992 | 3/2019 |
| CN | 110800245 | 2/2020 |

(Continued)

OTHER PUBLICATIONS

WO 2020088141 A1 (Year: 2020).*

(Continued)

*Primary Examiner* — Rushil P. Sampat
(74) *Attorney, Agent, or Firm* — Hodgson Russ LLP (57) ABSTRACT

Provided are a communication method and device, and a storage medium. Provided are a communication method and device, and a storage medium. The method includes: a control device determining a first resource and a second resource, there being no resource overlap between the first resource and the second resource; and the control device communicating with a first device via the first resource and communicating with a second device via the second resource, the second device including an energy collection module and/or a backscatter module.

25 Claims, 6 Drawing Sheets

(56) References Cited

U.S. PATENT DOCUMENTS

2022/0077886 A1* 3/2022 Yan .................. H04K 3/25
2022/0278886 A1* 9/2022 Yan .................. H04L 5/0082

FOREIGN PATENT DOCUMENTS

| CN | 111201826 | 5/2020 |
|---|---|---|
| EP | 2676393 | 12/2013 |
| WO | 2020005126 A1 | 1/2020 |

OTHER PUBLICATIONS

WO 2020233231 A1 (Year: 2020).*
EPO, Extended European Search Report for EP Application No. 20940388.0, Mar. 17, 2023.
Arnaud et al., "Ultra low-cost sensors using RFID standards for data collection, for IoT systems in food production and logistics," IEEE 11th Latin American Symposium on Circuits & Systems (LASCAS), 2020.
"Amazon Echo," Wikipedia, Dec. 2022.
WIPO, International Search Report and Written Opinion for PCT/CN2020/095941, Feb. 2, 2021.
"EPC Radio-Frequency Identity Protocols Generation-2 UHF RFID; Specification for RFID Air Interface; Protocol for Communications at 860 MHZ-960 MHZ, Version 2.0.0 Ratified," GS1, Nov. 2013, version 2.
EPO, Communication for EP Application No. 20940388.0, Jan. 26, 2024.

* cited by examiner

SIGNAL TRANSMISSION USING BACKSCATTER DEVICE IN WIRELESS COMMUNICATION

CROSS-REFERENCE TO RELATED APPLICATION

This application is a continuation of International Application No. PCT/CN2020/095941, filed Jun. 12, 2020, the entire disclosure of which is incorporated herein by reference.

TECHNICAL FIELD

The embodiments of the present application relate to communication technology, and in particular, to a communication method, device and storage medium.

BACKGROUND

With the development of Internet of Things (IOT) technology, IOT devices are being used more and more widely in life. In order to reduce the power consumption of the IOT devices, backscattering technology can be used to achieve zero power devices.

At present, the IOT devices are generally controlled by a control device in the IOT system. If there are the zero power device and other non-zero power device in the IOT system, such as a cell phone, a smart home device and other terminal devices, they are usually controlled by different control devices, and the communication cost is high.

SUMMARY

Embodiments of the present application provide a communication method, device, and a storage medium to reduce the communication cost of the IOT system.

In a first aspect, the embodiments of the present application may provide a communication method, including:
determining, by a control device, a first resource and a second resource, where the first resource and the second resource do not have an overlapping resource; and
communicating with a first device via the first resource and communicating with a second device via the second resource by the control device, where the second device includes an energy harvesting module and/or a backscattering module.

In a second aspect, the embodiments of the present application may provide a communication method, including:
obtaining, by a first device, a first resource set; where the first resource set is obtained by updating a third resource set according to a second resource set, and the second resource set is used by a control device to communicate with a second device;
determining, by the first device, a first resource according to the first resource set; and
communicating, by the first device, with the control device via the first resource.

In a third aspect, the embodiments of the present application may provide a communication method, including:
receiving, by a second device, control information sent by a control device via a second resource; and
sending, by the second device, feedback information to the control device according to the control information using a backscattering manner.

In a fourth aspect, the embodiments of the present application may further provide a control device, including:
a determination module, configured to determine a first resource and a second resource, where the first resource and the second resource do not have an overlapping resource; and
a processing module, configured to communicate with a first device via the first resource and communicate with a second device via the second resource, where the second device includes an energy harvesting module and/or a backscattering module.

In a fifth aspect, the embodiments of the present application may further provide a first device, including:
an obtaining module, configured to obtain a first resource set; where the first resource set is obtained by updating a third resource set according to a second resource set, and the second resource set is used by the control device to communicate with a second device;
a determination module, configured to determine a first resource according to the first resource set; and
a processing module, configured to communicate with the control device via the first resource.

In a sixth aspect, the embodiments of the present application may further provide a second device, including:
a receiving module, configured to receive control information sent by a control device via a second resource; and
a sending module, configured to send feedback information to the control device according to the control information using a backscattering manner.

In a seventh aspect, the embodiments of the present application may also provide a control device, including:
a processor, a memory, and an interface communicating with other device;
where the memory stores computer-executed instructions; and
the processor executes the computer-executed instructions stored in the memory, to cause the processor to perform the communication method according to any one item of the first aspect.

In an eighth aspect, the embodiments of the present application may further provide a first device, including:
a processor, a memory, and an interface communicating with other device;
where the memory stores computer-executed instructions; and
the processor executes the computer-executed instructions stored in the memory, to cause the processor to perform the communication method according to any one item of the second aspect.

In a ninth aspect, the embodiments of the present application may further provide a second device, including:
a processor, a memory, and an interface communicating with other device;
where the memory stores computer-executed instructions; and
the processor executes the computer-executed instructions stored in the memory, to cause the processor to perform the communication method according to any one item of the third aspect.

In a tenth aspect, the embodiments of the present application provide a computer readable storage medium, where the computer readable storage medium stores computer-executed instructions, and when the computer-executed instructions are executed by a processor, the communication method according to any one item of the first aspect is implemented.

In an eleventh aspect, the embodiments of the present application provide a computer readable storage medium, where the computer readable storage medium stores computer-executed instructions, and when the computer-executed instructions are executed by a processor, the communication method according to any one item of the second aspect is implemented.

In a twelfth aspect, the embodiments of the present application provide a computer readable storage medium, where the computer readable storage medium stores computer-executed instructions, and when the computer-executed instructions are executed by a processor, the communication method according to any one item of the third aspect is implemented.

In a thirteenth aspect, the embodiments of the present application provide a program for performing the communication method according to any one item of the first aspect above when the program is executed by a processor.

In a fourteenth aspect, the embodiments of the present application further provide a program for performing the communication method according to any one item of the second aspect above when the program is executed by a processor.

In a fourteenth aspect, the embodiments of the present application provide a program for performing the communication method according to any one item of the third aspect above when the program is executed by a processor.

Optionally, the processor may be a chip.

In a fifteenth aspect, the embodiments of the present application provide a computer program product including program instructions, the program instructions being used to implement the communication method according to any one item of the first aspect.

In a sixteenth aspect, the embodiments of the present application provide a computer program product including program instructions, the program instructions being used to implement the communication method according to any one item of the second aspect.

In a seventeenth aspect, the embodiments of the present application provide a computer program product including program instructions, the program instructions being used to implement the communication method according to any one item of the third aspect.

In an eighteenth aspect, the embodiments of the present application provide a chip including: a processing module and a communication interface, the processing module being capable of executing the communication method according to any one item of the first aspect.

Further, the chip further includes a memory module (e.g., a memory), the memory module is used for storing instructions, the processing module is used for executing the instructions stored in the memory module, and execution of the instructions stored in the memory module causes the processing module to execute the communication method according to any one item of the first aspect.

In a nineteenth aspect, the embodiments of the present application provide a chip, including: a processing module and a communication interface, the processing module being capable of executing the communication method according to any one item of the second aspect.

Further, the chip further includes a memory module (e.g., a memory), the memory module is used for storing instructions, the processing module is used for executing the instructions stored in the memory module, and execution of the instructions stored in the memory module causes the processing module to execute the communication method according to any one item of the second aspect.

In the twentieth aspect, the embodiments of the present application provide a chip, including: a processing module and a communication interface, the processing module being capable of executing the communication method according to any one item of the first aspect.

Further, the chip further includes a memory module (e.g., a memory), the memory module for storing instructions, the processing module is used for executing the instructions stored in the memory module, and execution of the instructions stored in the memory module causes the processing module to execute the communication method according to any one item of the third aspect.

The communication method, device, and storage medium provided by the embodiments of the present application are used in a scenario in which the control device communicates with the first device and the second device, where the second device includes an energy harvesting module and/or a backscattering module, and the control device communicates with the first device via the first resource, and communicates with the second device via the second resource. Since there is no overlapping resource in the first and second resources, the communication with the second device will not be affected when the control device communicates with the first device, and the communication with the first device will not be affected when the control device communicates with the second device, i.e., the communication between the control device and the first device and the communication between the control device and the second device do not affect each other, that is, the communication with different kinds of devices can be realized by the same control device, and the communication cost is low.

BRIEF DESCRIPTION OF THE DRAWINGS

In order to more clearly illustrate the technical solutions in the embodiments of the present application or related art, the following is a brief description of the drawings required to be used in the description of the embodiments or related art, and it is obvious that the drawings in the following description are some embodiments of the present application, and other drawings can be obtained according to these drawings without any creative labor for a person of ordinary skill in the art.

DETAILED DESCRIPTION

In order to make the purpose, technical solutions and advantages of the embodiments of the present application more clear, the technical solutions in the embodiments of the present application will be described clearly and completely below in conjunction with the accompanying drawings in the embodiments of the present application, and it is clear that the embodiments described are a part of the embodiments of the present application and not all of them. Based on the embodiments in the present application, all other embodiments obtained by a person of ordinary skill in the art without making creative labor fall within the scope of protection of the present application.

The terms "first", "second", etc. in the specification, claims and the above-mentioned drawings of the embodiments of present application are used to distinguish similar objects and need not be used to describe a particular order or sequence. It should be understood that the data so used may be interchanged, where appropriate, so that the embodiments of the present application described herein can be implemented, for example, in an order other than those illustrated or described herein. Further, the terms "include" and "have", and any variations thereof, are intended to cover non-exclusive inclusion, e.g., a process, a method, a system, a product, or a device including a series of steps or units need not be limited to those steps or units clearly listed, but may include other steps or units that are not clearly listed or that are inherent to such process, method, product, or device.

Figures 1, 2:
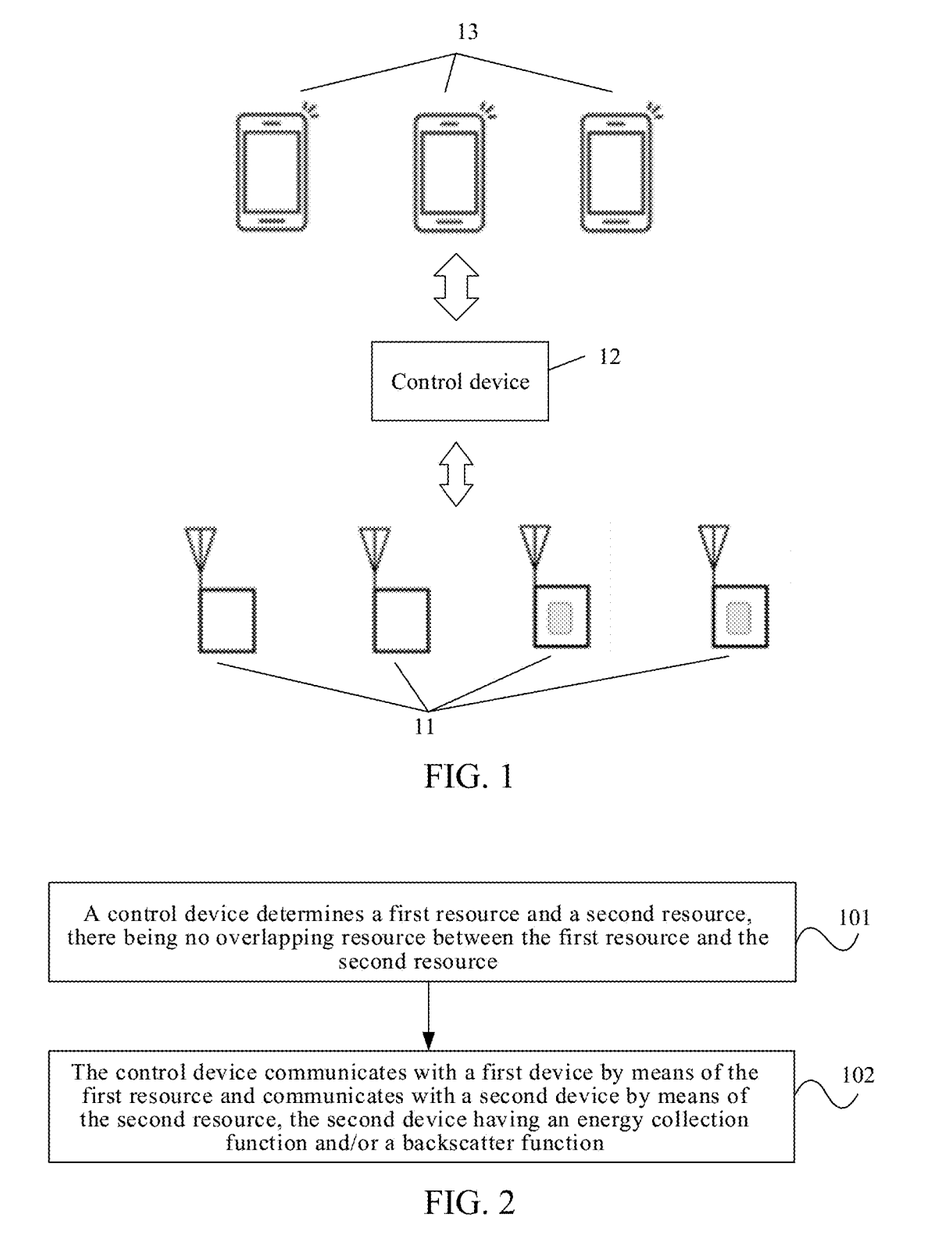
FIG. 1 is a schematic diagram of a system architecture applied in an embodiment of the present application.
FIG. 2 is a flowchart of an embodiment of a communication method provided by the present application.

FIG. 1 is a schematic diagram of a system architecture applied in an embodiment of the present application. As shown in FIG. 1, the communication system at least includes a first device 11, a control device 12, and a second device 13. It will be appreciated that in an actual communication system, the first device 11, the control device 12, and the second device 13 may all have one or more, and in FIG. 1, the control device is shown to be one as an example.

In FIG. 1, the second device 13 may include: an electronic tag, a smart sensor, etc. The second device is, for example, a zero power device.

In some embodiments, the second device includes an energy harvesting module and/or a backscattering module; where the energy harvesting module is used to implement an energy harvesting function and the backscattering module is used to implement a backscattering function.

In other embodiments, the energy harvesting function and the backscattering function described above may also be performed by a single module, which is not limited by the present application.

In some embodiments, the second device may not carry a power source.

The control device 12 may be a smart central controller HUB, which may also be referred to as a Bridge, etc. In some embodiments, the control device may exist in a variety of forms, such as integrating the functionality of other terminal devices, for example, integrating a smart speaker, or an intelligent Customer Premise Equipment (CPE), etc.

The first device 11 may be other terminal device, which may also be referred to as a mobile terminal, User Equipment (UE), an access terminal, a user unit, a user station, a mobile station, a mobile, a user terminal, a terminal, a wireless communication device, a user agent, or a user apparatus. Specifically, it may specially be a smartphone, a cellular phone, a cordless phone, a Personal Digital Assistant (PDA) device, a handheld device with wireless communication function or other processing device connected to a wireless modem, an in-vehicle device, a wearable device, etc. In the embodiments of the present application, the terminal device has an interface for communication with the control device.

In some embodiments, the first device 11 may not include the energy harvesting module or the backscattering module, i.e., it does not have an RF energy absorption function or a backscattering emission function.

In some embodiments, the first device 11 and the second device 13 may interact via the control device 12.

In some embodiments, the first device 11 and the control device 12 may communicate through a cloud network, for example, the control device 12 uploads information obtained from the second device 12 to the cloud, and the first device 11 may obtain the corresponding information from the cloud; the first device 11 may also send commands to the control device from the cloud to achieve control of the second device 13, supporting long-distance control.

In other embodiments, the first device 11 and the control device 12 may also communicate through wireless fidelity (WIFI), Bluetooth, Zigbee and other wireless communication technologies.

In other embodiments, the method of the embodiments of the present application may also be applicable to other system architectures, such as including a control device and a plurality of first devices, or, a control device and a plurality of second devices, or other system architectures, which are not limited by the embodiments of the present application.

The method of the embodiments of the present application is applicable to a variety of IOT scenarios, such as smart home scenarios, smart office scenarios, Internet of Vehicles, and so on.

Zero power devices have the following characteristics compared to traditional IOT devices: 1. the device itself does not carry power, relying on the collection of RF energy to power the active device within the device; 2. the wireless communication transmitter within the device adopts the backscattering principle, not actively transmitting signals, but realizing wireless communication by modulating the reflected signal.

At present, the Radio Frequency Identification (RFID) has adopted zero-power backscatter technology. Passive RFID is widely used for item tracking in logistics. However, due to compliance with the Electronic Product Code (EPC) Global 1 Gen 2 standard protocol, RFID systems require professional card reader. Therefore, the current communication with the zero power device of RFID needs a control device containing a professional card reader, and in the common smart home, office and other scenarios, the control device communicating with other terminal devices (such as a cell phone, a smart TV and other terminal devices) can not be used to communicate with the zero power device. If there is a need to realize the communication between the control device and the zero power device, the control device needs to be added with an RFID card reader module, and thus the hardware cost will increase and the communication cost is high.

The technical conception of the method of the embodiments in the present application is as follows.

Different resources are used to realize the communication between the control device and the first device, and the communication between the control device and the second device, the communications between the control device and the above two types of devices do not affect each other, and the communications with the above two types of devices can be realized by the same control device, and thus the communication cost is low.

The technical solution of the present application is described in detail in the following specific embodiments. These specific embodiments below may be combined with each other, and the same or similar concepts or processes may not be repeated in some embodiments.

FIG. 2 is a flowchart of an embodiment of a communication method provided in the present application. As shown in FIG. 2, the execution subject of the present embodiment is a control device, and the specific steps for implementing the method of the present embodiment include the following steps.

In step 101, the control device determines a first resource and a second resource, and there is no overlapping resource in the first resource and the second resource.

Specifically, the control device determines a first resource for communicating with the first device and a second resource for communicating with the second device before communicating with the first device and the second device.

In order to achieve that the first device and the second device do not affect each other when the control device is in communication with the first device and the second device, there is no overlapping resource in the first resource and the second resource.

The first resource and the second resource may be a time domain resource and/or a frequency domain resource.

For example, the first resource is a channel resource and the second resource is a channel resource, and the first resource and the second resource include different channels.

The second device may be an energy harvesting module and/or a backscattering module, i.e. having an energy harvesting function and/or a backscattering function, and the first device may not include an energy harvesting module or a backscattering module, i.e. not having the energy harvesting function or the backscattering function described above.

In the following embodiments, the first device is a non-zero power device and the second device is a zero power device for illustration, and the zero power device in the embodiments of the present application refers to having the energy harvesting function and/or the backscattering function.

In step 102, the control device communicates with the first device via the first resource, and communicates with the second device via the second resource, the second device including an energy harvesting module and/or a backscattering module.

Specifically, the control device communicates with the first device via the first resource and communicates with the second device via the second resource. Since there is no overlapping resource in the first resource and the second resource, i.e., the control device uses different resources to communicate with the first device and the second device, respectively, the communication with the second device will not be affected when the control device communicates with the first device, and the communication with the first device will not be affected when the control device communicates with the second device, i.e., the communication between the control device and the first device and the communication between the control device and the second device do not affect each other.

In the communication method of this embodiment, in a scenario where the control device communicates with the first device and the second device, the second device includes an energy harvesting module and/or a backscattering module, i.e., having an energy harvesting function and/or a backscattering function, and the control device communicates with the first device through the first resource and communicates with the second device through the second resource. Since there is no overlapping resource in the first resource and the second resources, the communication with the second device will not be affected when the control device communicates with the first device, and the communication with the first device will not be affected when the control device communicates with the second device, i.e., the communication between the control device and the first device and the communication between the control device and the second device do not affect each other, that is, the communication with different kinds of devices can be realized by the same control device, and the communication cost is low.

In other embodiments, the solution of the present application may also be used in the terminal device, that is, the execution subject of the above method may also be the terminal device, and the terminal device realizes the communication with the zero power device and other devices, and the other devices may be the terminal device or the control device and other devices, which is not limited by the embodiments of the present application; the terminal device may directly control the zero power device.

In an embodiment, step 101 may be achieved by:

the control device obtaining a first resource set corresponding to the first device and a second resource set corresponding to the second device;

the control device using at least one resource in the first resource set as the first resource; and the control device using at least one resource in the second resource set as the second resource.

Specifically, the control device obtains the first resource set corresponding to the first device, the resources included in the first resource set may be pre-selected, and the selection criteria for the resources included in the first resource set are determined according to specific implementation, which is not limited by the embodiments of the present application.

In an embodiment, the first resource set includes identifications of a plurality of resources available to the first device. The resources may be time domain resources and/or frequency domain resources. For example, the first resource set includes identifications of a plurality of channels available to the first device, for example, selecting any channel from the plurality of channels shown in FIG. 3 to form the first resource set.

The control device obtains a second resource set corresponding to the second device, and the resources included in the second resource set may be pre-selected, and the selection criteria for the resources included in the second resource set are determined according to specific implementation, which is not limited by the embodiments of the present application.

In an embodiment, the second resource set includes identifications of a plurality of resources available to the second device. The resources may be time domain resources and/or frequency domain resources. For example, the second resource set includes identifications of a plurality of channels available to the second device, for example, selecting any channel from the plurality of channels shown in FIG. 3 to form the second resource set.

The control device selects a first resource from the first resource set, such as selecting all or a portion of the resources as the first resource, and selects a second resource from the second resource set for use in communication with the second device, such as selecting all or a portion of the resources as the second resource.

In an embodiment, the first resource set and the second resource set are subsets of a predefined resource set; the predefined resource set follows at least one of the following communication protocols: Bluetooth protocol, wireless fidelity (WIFI) protocol, and Zigbee protocol.

Figure 3:
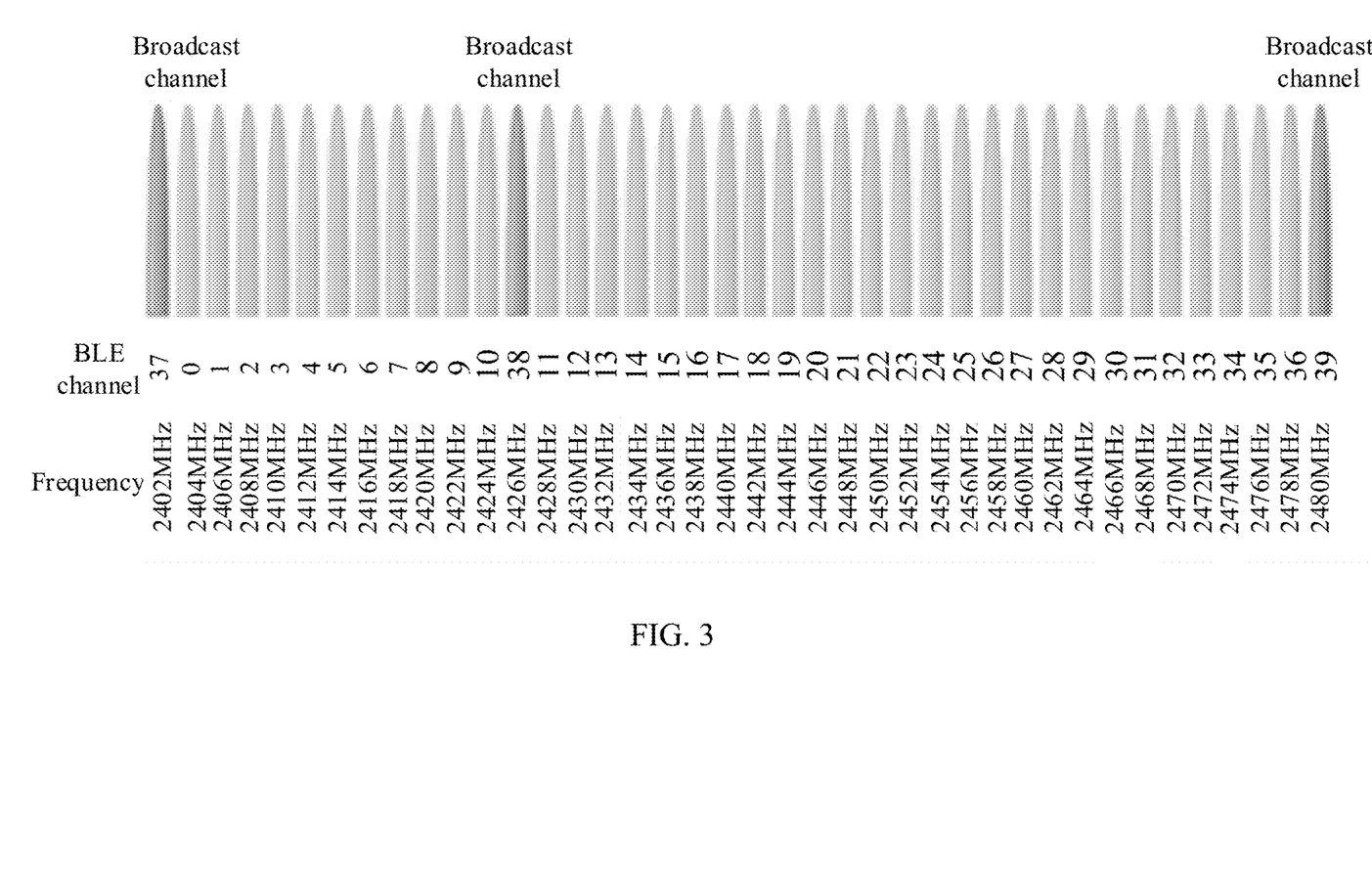
FIG. 3 is a schematic diagram of a channel distribution of an embodiment provided by the present application.

Among them, the Bluetooth protocol may be Bluetooth Low Energy (BLE) protocol. As shown in FIG. 3, the channel distribution in FIG. 3 is a channel distribution defined by the BLE protocol, and the first resource set and the second resource set may be selected from 40 channels in FIG. 3, or selected from the channels except for 3 broadcast channels, which are not limited by the embodiments of the present application.

In an embodiment, the first device may communicate with the control device via the first resource using frequency hopping, such as selecting all of the resources in the first resource set to communicate using frequency hopping.

It should be noted that the above steps of determining the first resource and the second resource are not in a sequential relationship.

In an embodiment, before step 101, the following step is also included:

in a process of the control device communicating with the first device via a resource in a third resource set, the control device obtains control information, which is used to control the second device.

Specifically, before communicating with the second device, the control device establishes a connection with the first device and performs normal data interaction by using at least one of the following communication protocols: a Bluetooth protocol, a wireless fidelity (WIFI) protocol, a Zigbee protocol, etc. The Bluetooth protocol may be a Bluetooth Low Energy (BLE) protocol. The third second resource set is a predetermined resource set, such as a resource set following at least one of the above communication protocols, or a subset of the resource set conforming to at least one of the above communication protocols.

The control device obtains control information, and the control information is used for control of the zero power device or for data acquisition.

In the above implementation, the communication between the control device and the first device and the second device follows any of the above communication protocols, i.e., the communication between the control device and the first device and the second device may follow the same communication protocol, so the control device may reuse the existing device, such as a gateway for controlling the terminal devices in a home system, without changing the hardware of the existing control device and without increasing hardware cost, and thus the communication cost is low.

Further, "the control device obtaining the first resource set corresponding to the first device" may be achieved by:

the control device updating the third resource set according to the second resource set to obtain the first resource set; so that the first resource set and the second resource set do not intersect.

Specifically, the control device updates the pre-acquired third resource set according to the second resource set to obtain the first resource set, specifically, the first resource set may be obtained by removing the resources in the second resource set from the third resource set.

The first resource set may be implemented in a table form, such as table T1, and resources in the table T1 are used for the first device to communicate with the control device. The second resource set may also be implemented in a table form, such as table T2, and the table T2 is used for the control device to communicate with the second device.

In an embodiment, T1 and T2 are both subsets of a predefined resource set. As shown in FIG. 3, the predefined resource set includes the BLE 40 channels.

In an embodiment, the control device sends the first resource set obtained by update to the first device, and the first device updates the third resource set and interacts with the control device through the resources in the first resource set, and the interaction between the first device and the control device is not interrupted during this process.

In the above implementation, the control device, after determining the second resource set for communication with the second device, updates the third resource set so that the first resource set obtained by update does not intersect with the second resource set, and then the control device communicates with the first device based on the first resource selected from the first resource set obtained by update, and communicates with the second device based on the second resource selected from the second resource set, i.e., the communication between the control device and the first device and the communication between the control device and the second device do not affect each other, the control device can also achieve communication with the second device through a communication component that communicates with the first device, without the need to add a communication component that specifically communicates with the zero power device, and the communication cost is low.

In an embodiment, the control device communicating with the second device through the second resource specifically includes the following process:

the control device sending control information to the second device through the second resource;

the control device receiving feedback information sent by the second device using a backscattering manner; where the feedback information is sent by the second device based on the control information.

Specifically, the control device sends control information to the second device through the second resource, and the second device sends feedback information to the control device using the backscattering manner; the control information is, for example, to obtain the sensing information of the sensor in the second device, or the electronic tag ID, or to control the second device, such as to modify the data in the second device, or to control the operation time of the second device, and so on.

The control information is sent for a duration of $T_{search}$, and $T_{search}$ depends on the specific application, which is not limited in the embodiments of the present application.

In an embodiment, the control information is information modulated by at least one of the following modulation manners, and the at least one modulation manner includes: an Amplitude Shift Keying (ASK), a Frequency Shift Keying (FSK) or a Gaussian Frequency Shift Keying (GFSK).

In an embodiment, before sending the control information, the method further includes:

the control device transmitting a continuous wave signal to the second device via a third resource; the third resource being a resource in the second resource set.

Optionally, the control information includes a frequency of the continuous wave signal.

Specifically, the control device may select the third resource from the second resource set for transmitting a continuous wave signal to the second device, and assuming that the third resource is a channel, then the control device may transmit a Continuous Wave (CW) of a center frequency of the channel.

There may be a plurality of resources in the second resource set, and the third resource may be selected according to the actual application condition. The CW signal is transmitted for a duration of $T_{CW}$, which is determined by the actual application condition and is not limited by the embodiments of the present application.

The frequency of the CW signal may be carried in the control information.

In an embodiment, the control device may also communicate with the second device using frequency hopping; e.g., transmitting a continuous wave signal using frequency hopping, and/or, sending the control information using frequency hopping.

For example, the continuous wave signal is transmitted using frequency hopping, with different frequencies transmitting continuous wave signals of different durations.

In an embodiment, the second resource and the third resource may be the same resource, or different resources, and the present application is not limited thereto.

The second device receives CW energy and converts this alternating RF energy into direct current (DC) energy for powering the active device within the second device.

Further, after the control device sends the control information, it may continue to transmit continuous wave signals through the third resource until the reception of the feedback information sent by the second device is completed.

Specifically, since the second device needs to send the feedback information to the control device via backscattering, the control device needs to continuously transmit the CW signal. The second device sends the feedback information to the control device by backscattering the CW signal.

The control device finishes controlling the second device and stops transmitting the CW wave signal, for example, if the feedback information from the second device is not received within a predetermined time period, or the second device notifies the control device that the sending of the feedback information is completed, etc.

In the above implementation, based on the characteristics of the zero power device itself, the interaction with the control device is achieved without affecting the communication between the control device and other terminal device(s), and the communication cost is low.

Further, the control device may upload the feedback information to a server or to the first device.

For example, the control device uploads this feedback information to the cloud, and the first device may obtain the corresponding information from the cloud.

Figure 4:
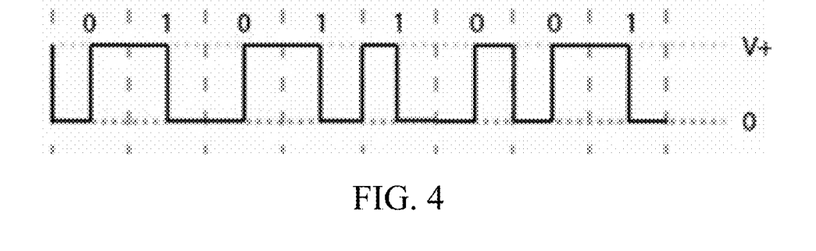
FIG. 4 is a schematic diagram of coding of an embodiment provided by the present application.

In an embodiment, the control information is information encoded using the Manchester encoding manner.

Specifically, in order to continuously provide power to the second device, the control information may be encoded in a way that the individual digital signals are not continuously kept low potential, such as the Manchester Manchester encoding manner in FIG. 4. The digits "0" and "1" both contain high and low potential components. It is assumed that the low potential will not be maintained for a long time even if multiple 0 or 1 are maintained.

In an embodiment, if the second device only has the RF energy absorption function and does not have the backscattering emission function, the control device does not need to transmit the CW signal after sending the control information, and the second device may transmit the feedback information through an active transmitter device.

In an embodiment, if the second device only has the function of backscattering emission and does not have the function of RF energy absorption, the control device does not need to transmit CW signal before sending the control information, and the control information may be encoded in other ways besides using the Manchester encoding, which is not limited by the embodiments of the present application.

In an embodiment, after the reception of the feedback information sent by the second device is completed, the method further includes:

the control device updating the first resource set obtained by update to obtain a fourth resource set;

the control device sending the fourth second resource set to the first device.

In an embodiment, updating the first resource set includes:

the control device adding resources of the second resource set into the first resource set to obtain the fourth resource set.

Specifically, after the communication between the control device and the zero power device is completed, the control device may release the resource used to communicate with the zero power device, and update again the first resource set obtained by update, such as adding all or part of the resources in the second resource set to the first resource set obtained by update to obtain the fourth resource set, and pass information of this fourth resource set to the terminal device. The terminal device obtains the information of this fourth resource set, updates the first resource set in the terminal device, and continuously performs data interaction with the control device using the resource in the fourth resource set. The data interaction between the terminal device and the control device is not interrupted during this process.

In the above implementation, the control device releases the resources in the second resource set and updates the first resource set, increasing the resources for communication with the first device and improving the communication efficiency.

In an embodiment, if the number of the first device is at least two, the first resource set is used to communicate with at least two first devices.

For a plurality of terminal devices, they may use the same first resource set to communicate with the control device, such as using frequency hopping to communicate with the control device.

Figure 5:
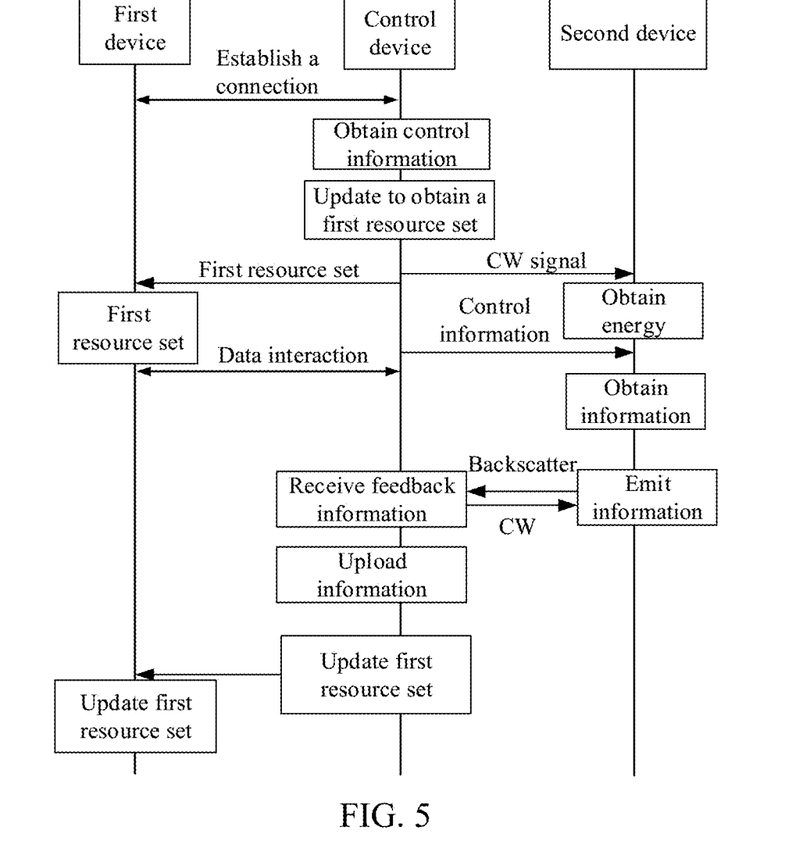
FIG. 5 is a flowchart of an interaction of an embodiment of the communication method provided in the present application.

In an embodiment, as shown in FIG. 5, the control device establishes a connection with the first device and may perform normal data interaction by using, for example, any of the communication protocols described in the preceding embodiments.

The control device obtains the control information, which is command information for control of the second device and data acquisition.

The control device obtains the first resource set by update, which is particularly operated as: generating two resource tables T1 and T2 within the control device, T1 is for the terminal device and T2 is for the zero power backscattering IOT device. For example, T1 and T2 are both subsets of the BLE 40 channels, and T1 and T2 channels have no intersection. The channel selected in the T2 table is pre-selected, and the channel selection criterion is determined by the specific implementation, and T2 corresponds to the second resource set. The channels selected in the T1 table are the channels in the first resource set after updating the third resource set obtained in advance.

The control device sends the first resource set obtained by update to the first device, and the first device updates the resource set and uses the first resource set to continuously perform data interaction with the control device, during which the information interaction between the first device and the control device is not interrupted.

The control device transmits the CW signal to the second device based on the resource in the second resource set.

The second device receives the CW signal energy and converts this alternating RF energy into DC energy for powering the active device(s) in the second device.

The control device sends control information to the second device, this control information contains the frequency of the CW signal emitted by the control device, and control information for the zero power backscattering IOT device, such as obtaining an electronic tag ID, or obtaining sensing information of the smart sensor, etc.

The control device continuously emits the CW signal.

The second device transmits feedback information to the control device through backscattering.

The control device finishes controlling the second device, stops transmitting the CW signal, and uploads this feedback information to the cloud.

The control device updates the first resource set, and passes the fourth resource set that is obtained by another update to the terminal device.

The terminal device obtains this updated fourth resource set and updates the local first resource set, and continuously performs data interaction with the control device using the updated first resource set. The data interaction is not interrupted during this process.

Figure 6:
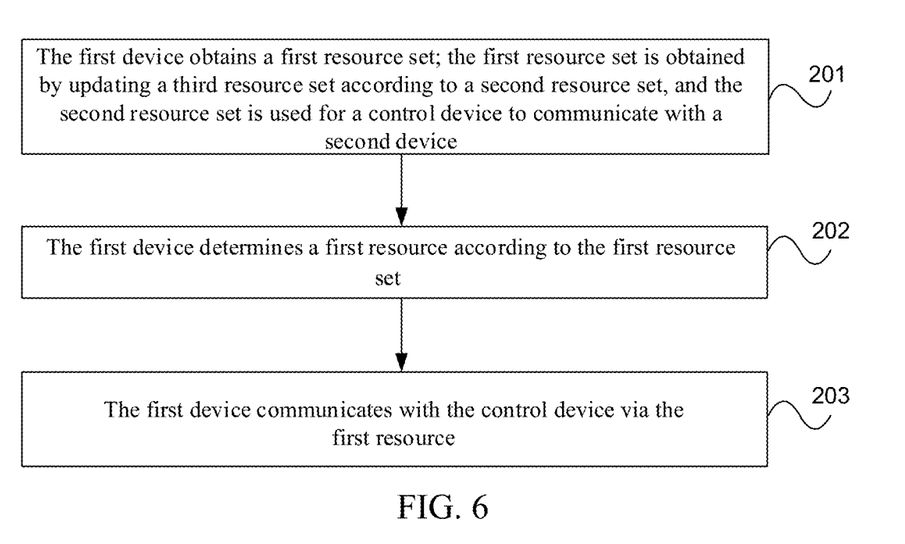
FIG. 6 is a flowchart of another embodiment of the communication method provided by the present application.

FIG. 6 is a flow chart of another embodiment of the communication method provided in present application. As shown in FIG. 6, the execution subject of this embodiment is a first device, the first device may be a terminal device, and the specific steps for implementing the method of this embodiment include the following steps.

In step 201, the first device obtains a first resource set; the first resource set is obtained by updating a third resource set according to a second resource set, and the second resource set is used for a control device to communicate with a second device.

In step 202, the first device determines a first resource according to the first resource set.

In step 203, the first device communicates with the control device via the first resource.

Specifically, the first device obtains the first resource set before communicating with the control device, the first resource set may be sent to the first device by the control device, and the first device determines the first resource according to the first resource set and communicates with the control device through the first resource. For example, some or all of the resources in the first resource set are selected as the first resource.

In the scenario shown in FIG. 1, the second device includes an energy harvesting module and/or a backscattering module, i.e., having an energy harvesting function and/or a backscattering function, for example, the second device is a zero power device, and when the control device communicates with the first device and the second device, in order to make the communication between the control device and the first device and the communication between the control device and the second device not affect each other, the control device allocates the second resource set for communicating with the second device, and updates the resource set used by the first device to communicate with the control device so that the first resource set obtained by update and the second resource set do not intersect, and the control device sends the updated first resource set to the first device.

in an embodiment, the first resource set includes identifications of a plurality of resources available to the first device;

the second resource set includes identifications of a plurality of resources available to the second device.

In an embodiment, the first resource set obtained by update has no intersection with the second resource set.

In an embodiment, the second device includes an energy harvesting module and/or a backscattering module, i.e. having an energy harvesting function and/or a backscattering function.

In an embodiment, the first device communicating with the control device via the first resource, includes:

the first device communicating with the control device via the first resource using frequency hopping.

In an embodiment, the resource includes a frequency domain resource and/or a time domain resource.

In an embodiment, the first resource set and the second resource set are subsets of a predefined resource set; the predefined resource set follows at least one of the following communication protocols: a Bluetooth protocol, a wireless fidelity (WIFI) protocol, a Zigbee protocol.

In an embodiment, if the communication protocol includes the Bluetooth protocol, the Bluetooth protocol is a Bluetooth Low Power (BLE) protocol.

In the above implementation, the communication between the control device and the first device and the second device follows any of the above communication protocols, i.e. the communication between the control device and the first device and the communication between the control device and the second device may follow the same communication protocol, therefore the control device may reuse the existing device, such as a gateway and other devices that control the terminal device in the home system, without changing the hardware of the existing control device and without increasing hardware cost, and thus the communication cost is low.

The implementation principle and technical effect of the communication method in the present embodiment are similar to the communication method on the control device side, which will not be repeated here.

Figure 7:
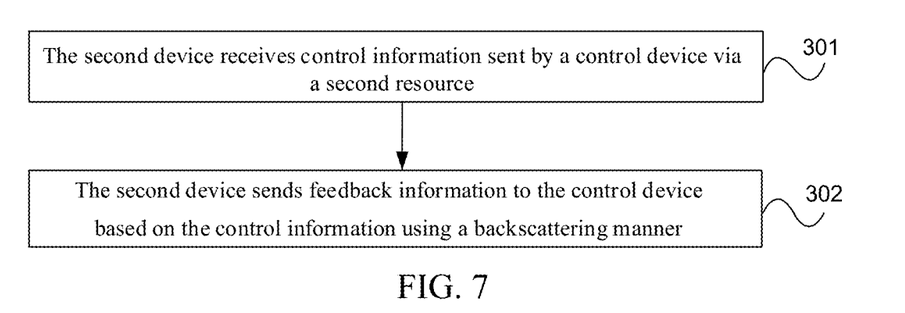
FIG. 7 is a flowchart of yet another embodiment of the communication method provided by the present application.

FIG. 7 is a flow chart of another embodiment of the communication method provided in present application. As shown in FIG. 7, the execution subject of this embodiment is a second device, the second device may be a zero power backscattering IOT device, and the specific steps of the implementation of the method of this embodiment include the following steps.

In step 301, the second device receives control information sent by a control device via a second resource.

In step 302, the second device sends feedback information to the control device based on the control information using a backscattering manner.

In an embodiment, the second resource is determined by the control device based on a second resource set corresponding to the second device.

In an embodiment, the second resource set includes identifications of a plurality of resources available to the second device.

In an embodiment, before the second device receiving control information sent by the control device via the second resource, the method further includes:

the second device receiving a continuous wave signal transmitted by the control device via a third resource; the third resource being a resource in the second resource set; the control information including a frequency of the continuous wave signal.

In an embodiment, after the second device receiving control information sent by the control device via the second resource, the method further includes:

the second device receiving a continuous wave signal transmitted by the control device via a third resource.

The second device sending feedback information to the control device based on the control information using a backscattering manner, includes:

the second device sending feedback information to the control device via the continuous wave signal using the backscattering manner.

In an embodiment, the control information is information encoded using a Manchester encoding manner.

In an embodiment, the control information is information modulated using at least one of the following modulation manners, the at least one modulation manner including: an amplitude shift keying (ASK), a frequency shift keying (FSK) or a Gaussian frequency shift keying (GFSK).

In an embodiment, the resource includes a frequency domain resource and/or a time domain resource.

In an embodiment, the second resource set is a subset of a predefined second resource set; the predefined second resource set follows at least one of the following communication protocols: a Bluetooth protocol, a wireless fidelity (WIFI) protocol, a Zigbee protocol.

In an embodiment, if the communication protocol includes the Bluetooth protocol, the Bluetooth protocol is a Bluetooth Low Power (BLE) protocol.

The principle of implementation and technical effect of the communication method in this embodiment are similar to the communication method on the control device side, and will not be repeated here.

Figure 8:
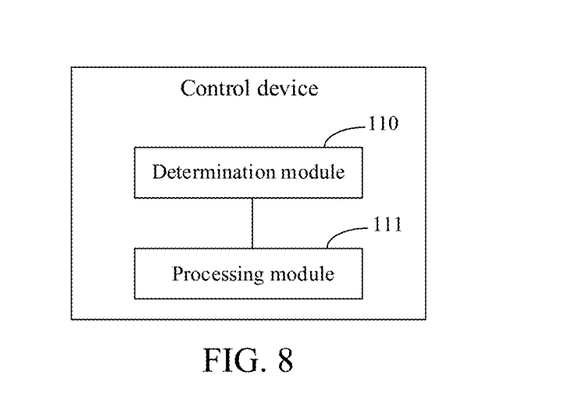
FIG. 8 is a schematic diagram of a structure of an embodiment of a control device provided by the present application.

FIG. 8 shows a schematic structure of an embodiment of the control device provided in the present application. As shown in FIG. 8, the control device includes:

a determination module 110, configured to determine a first resource and a second resource, no overlapping resource being present in the first resource and the second resource;

a processing module 111, configured to communicate with a first device via the first resource and communicate with a second device via the second resource, the second device including an energy harvesting module and/or a backscattering module.

In a possible implementation, the determination module 110 is specifically configured to:

obtain a first resource set corresponding to the first device and a second resource set corresponding to the second device;

taking at least one resource in the first resource set as the first resource;

taking at least one resource in the second resource set as the second resource.

In a possible implementation, the first resource set includes identifications of a plurality of resources available to the first device;

the second resource set includes identifications of a plurality of resources available to the second device.

In a possible implementation, the determination module 110 is further configured to:

obtain control information during communication of the control device with the first device through a resource in the third resource set, the control information being used to control the second device.

In a possible implementation, the determination module 110 is specifically configured to:

update the third resource set according to the second resource set to obtain a first resource set; so that the first resource set and the second resource set do not intersect.

In a possible embodiment, the processing module 111 is specifically configured to:

send the control information to the second device via the second resource;

receive feedback information sent by the second device using a backscattering manner; the feedback information being sent by the second device in accordance with the control information.

In a possible implementation, the processing module 111 is further configured to:

transmit a continuous wave signal to the second device via a third resource prior to sending the control information; the third resource being a resource in the second resource set; the control information including a frequency of the continuous wave signal.

In a possible implementation, the processing module 111 is further configured to:

transmit a continuous wave signal via the third resource after sending the control information, until reception of the feedback information sent by the second device is completed.

In a possible embodiment, the determination module 110 is further configured to:

update the first resource set to obtain a fourth second resource set after the reception of the feedback information sent by the second device is completed; and a sending module is configured to send the fourth resource set to the first device.

In a possible implementation, the determination module 110 is specifically configured to:

add, by the control device, the resources of the second resource set to the first resource set to obtain the fourth resource set.

In a possible implementation, the control information is information encoded using a Manchester encoding manner.

In a possible implementation, the control information is information modulated using at least one of the following modulation manners, the at least one modulation manner including: an amplitude shift keying (ASK), a frequency shift keying (FSK) or a Gaussian frequency shift keying (GFSK).

In a possible implementation, the sending module is further configured to:

upload the feedback information to a server or the first device.

In a possible implementation, the processing module 111 is specifically configured to:

communicate with the first device via the first resource using frequency hopping.

In a possible implementation, if the number of the first devices is at least two, the processing module is specifically configured to: communicate with at least two first devices using the first resource set.

In a possible implementation, the resource includes a frequency domain resource and/or a time domain resource.

In a possible implementation, the first resource set and the second resource set are subsets of a predefined resource set; the predefined resource set follows at least one of the following communication protocols: a Bluetooth protocol, a wireless fidelity (WIFI) protocol, a Zigbee protocol.

In a possible implementation, if the communication protocol includes the Bluetooth protocol, the Bluetooth protocol is a Bluetooth Low Power (BLE) protocol.

The control device in this embodiment can be used to perform the technical solution of any of the above method embodiments on the side of the control device with similar implementation principles and technical effects, which are not repeated here.

Figure 9:
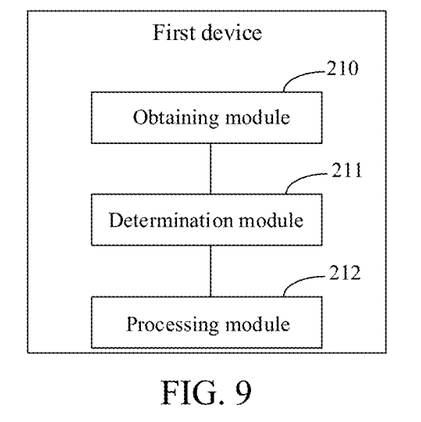
FIG. 9 is a schematic diagram of a structure of an embodiment of a first device provided by the present application.

FIG. 9 shows a schematic structure of an embodiment of the first device provided in present application. As shown in FIG. 9, the first device includes:
- an obtaining module 210, configured to obtain a first resource set; the first resource set is obtained by updating a third resource set according to a second resource set, the second resource set being used for the control device to communicate with the second device;
- a determination module 211, configured to determine a first resource based on the first resource set;
- a processing module 212, configured to communicate with the control device via the first resource.

The first device in the embodiments of the present application may be a terminal device.

In a possible implementation, the first resource set includes identifications of a plurality of resources available to the first device;
- the second resource set includes identifications of a plurality of resources available to the second device.

In a possible implementation, the first resource set does not intersect with the second second resource set.

In a possible implementation, the second device includes an energy harvesting module and/or a backscattering module, where the energy harvesting module is used to implement an energy harvesting function and the backscattering module is used to implement a backscattering function.

In a possible implementation, the processing module 212 is specifically configured to:
- communicate, by the first device, with the control device via the first resource using frequency hopping.

In a possible implementation, the resource includes a frequency domain resource and/or a time domain resource.

In a possible implementation, the first resource set and the second resource set are subsets of a predefined resource set; the predefined resource set follows at least one of the following communication protocols: a Bluetooth protocol, a wireless fidelity (WIFI) protocol, and a Zigbee protocol.

In a possible implementation, if the communication protocol includes the Bluetooth protocol, the Bluetooth protocol is a Bluetooth Low Power (BLE) protocol.

The first device of this embodiment may be used to implement the technical solution of any of the above method embodiments on the first device side, and the implementation principles and technical effects are similar, which are not repeated here.

Figure 10:
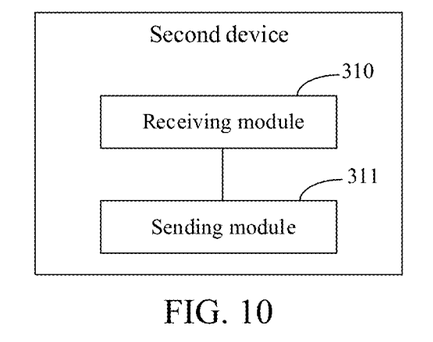
FIG. 10 is a schematic diagram of a structure of an embodiment of a second device provided by the present application.

FIG. 10 is a schematic diagram of a structure of an embodiment of a second device provided in the present application. As shown in FIG. 10, the second device includes:
- a receiving module 310, configured to receive control information sent by the control device via a second resource;
- a sending module 311, configured to send feedback information to the control device based on the control information using a backscattering manner.

In a possible implementation, the second resource is determined by the control device based on a second resource set corresponding to the second device.

In a possible implementation, the second resource set includes identifications of a plurality of resources available to the second device.

In a possible implementation, the receiving module 310 is further configured to:
- receive a continuous wave signal transmitted by the control device via a third resource prior to receiving the control information sent by the control device via the second resource; the third resource being a resource in the second resource set; the control information including a frequency of the continuous wave signal.

In a possible implementation, the receiving module 310 is further configured to:
- after receiving the control information sent by the control device via the second resource, receive the continuous wave signal transmitted by the control device via the third resource.

The sending module 311 is specifically configured to:
- send the feedback information to the control device via the continuous wave signal using a backscattering manner.

In a possible implementation, the control information is information encoded using a Manchester encoding manner.

In a possible implementation, the control information is information modulated using at least one of the following modulation manners, the at least one modulation manner including: an amplitude shift keyed (ASK), a frequency shift keyed (FSK) or a Gaussian frequency shift keyed (GFSK).

In a possible implementation, the second device further includes an energy harvesting module and/or a backscattering module.

In a possible implementation, the resource includes a frequency domain resource and/or a time domain resource.

In a possible implementation, the second resource set is a subset of a predefined resource set; the predefined resource set follows at least one of the following communication protocols: a Bluetooth protocol, a wireless fidelity (WIFI) protocol, a Zigbee protocol.

In a possible implementation, if the communication protocol includes the Bluetooth protocol, the Bluetooth protocol is a Bluetooth Low Power (BLE) protocol.

Figure 11:
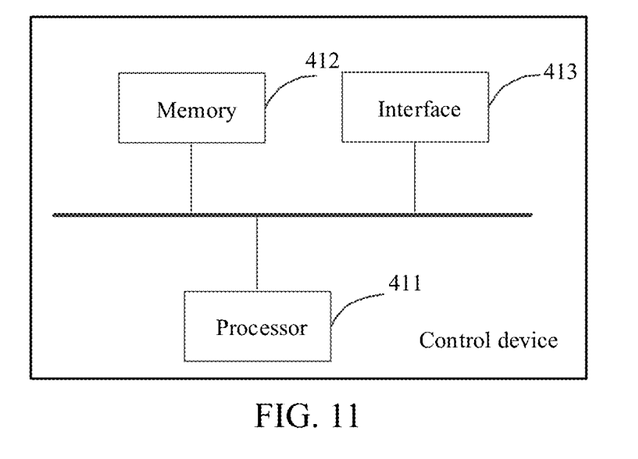
FIG. 11 is a schematic diagram of a structure of another embodiment of the control device provided by the present application.

FIG. 11 shows a schematic diagram of a structure of another embodiment of the control device provided in the present application. As shown in FIG. 11, the control device includes:
- a processor 411, a memory 412, an interface 413 for communication with other device(s);
- the memory 412 stores computer-executed instructions;
- the processor 411 executes the computer-executed instructions stored in the memory, causing the processor 411 to execute the technical solution on the side of the control device in any of the preceding method embodiments.

FIG. 11 shows a simple design of the control device. The embodiments of the present application do not limit the number of processors and memories in the control device, and FIG. 11 is illustrated only in the number of 1 as an example.

Figure 12:
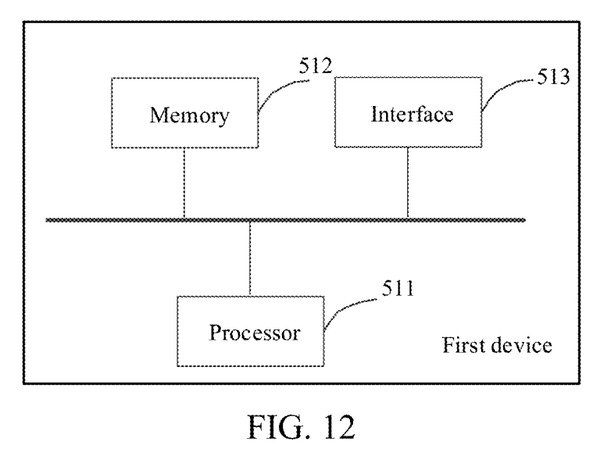
FIG. 12 is a schematic diagram of a structure of another embodiment of the first device provided by the present application.

FIG. 12 shows a schematic diagram of a structure of another embodiment of the first device provided in present application. As shown in FIG. 12, the first device includes:
- a processor 511, a memory 512, an interface 513 for communication with other device(s);

the memory 512 stores computer-executed instructions;

the processor 511 executes the computer-executed instructions stored in the memory 512, causing the processor 511 to execute the technical solution on the side of the first device in any of the preceding method embodiments.

FIG. 12 shows a simple design of the first device, and the embodiments of the present application do not limit the number of processors and memories in the first device, and FIG. 12 is illustrated only in the number of 1 as an example.

Figure 13:
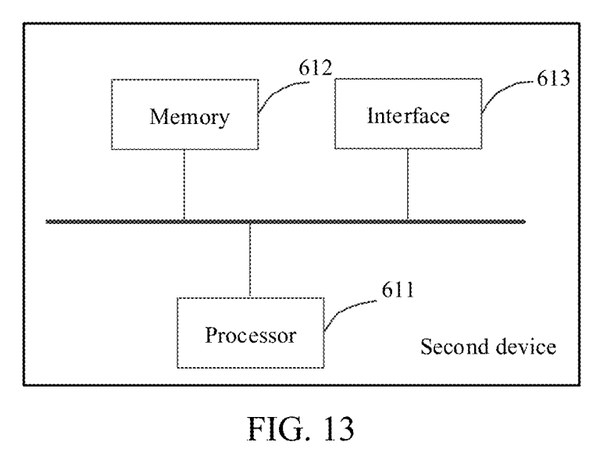
FIG. 13 is a schematic diagram of a structure of another embodiment of the second device provided by the present application.

FIG. 13 shows a schematic diagram of a structure of another embodiment of the second device provided in present application. As shown in FIG. 13, the first device includes:

a processor 611, a memory 612, an interface 613 for communication with other device(s);

the memory 612 stores computer-executed instructions.

the processor 611 executes the computer-executed instructions stored in the memory 612, causing the processor 611 to execute the technical solution on the side of the first device in any of the preceding method embodiments.

FIG. 13 shows a simple design of a second device, and the embodiments of the present application do not limit the number of processors and memories in the second device, and FIG. 13 is illustrated only in the number of 1 as an example.

In a specific implementation of the control device shown in FIG. 11, the first device described in FIG. 12 and the second device described in FIG. 13 above, the memory, the processor and the interface may be connected to each other via a bus, and optionally, the memory may be integrated inside the processor.

The embodiments of the present application also provide a computer readable storage medium, the computer readable storage medium has computer-executed instructions stored therein, and when the computer-executed instructions are executed by a processor, the technical solutions of the control device in any of the preceding method embodiments are implemented.

The embodiments of the present application also provide a computer readable storage medium, the computer readable storage medium has computer-executed instructions stored therein, and when the computer-executed instructions are executed by a processor, the technical solutions of the first device in any of the preceding method embodiments are implemented.

The embodiments of the present application also provide a computer readable storage medium, the computer readable storage medium has computer-executed instructions stored therein, and when the computer-executed instructions are executed by a processor, the technical solutions of the second device in any of the preceding method embodiments are implemented.

The embodiments of the present application further provide a program for implementing the technical solution of the control device in any of the preceding method embodiments when the program is executed by a processor.

The embodiments of the present application further provide a program for implementing the technical solution of the first device in any of the preceding method embodiments when the program is executed by a processor.

The embodiments of the present application further provide a program for implementing the technical solution of the second device in any of the preceding method embodiments when the program is executed by a processor.

Optionally, the processor may be a chip.

The embodiments of the present application also provide a computer program product including program instructions, the program instructions being used to implement the technical solution of the control device in any of the preceding method embodiments.

The embodiments of the present application also provide a computer program product including program instructions, the program instructions being used to implement the technical solution of the first device in any of the preceding method embodiments.

The embodiments of the present application also provide a computer program product including program instructions, the program instructions being used to implement the technical solution of the second device in any of the preceding method embodiments.

The embodiments of the present application also provide a chip including: a processing module and a communication interface, the processing module being capable of implementing the technical solution of the control device side of any of the preceding method embodiments.

Further, the chip further includes a storage module (e.g., a memory), the storage module is used to store instructions, the processing module is used to execute the instructions stored in the storage module, and execution of the instructions stored in the storage module causes the processing module to execute the technical solution on the control device side of any of the preceding method embodiments.

The embodiments of the present application further provide a chip including: a processing module and a communication interface, the processing module being capable of executing the technical solution of the first device side of any of the preceding method embodiments.

Further, the chip further includes a memory module (e.g., a memory), the memory module is used to store instructions, the processing module is used to execute the instructions stored in the memory module, and execution of the instructions stored in the memory module causes the processing module to execute the technical solution on the first device side of any of the preceding method embodiments.

The embodiments of the present application also provide a chip including: a processing module and a communication interface, the processing module being capable of executing the technical solution of the second device side of any of the preceding method embodiments.

Further, the chip further includes a storage module (e.g., a memory), the storage module is used to store instructions, the processing module is used to execute the instructions stored in the storage module, and execution of the instructions stored in the storage module causes the processing module to execute the technical solution of the second device side of any of the preceding method embodiments.

In several embodiments provided in the present application, it should be understood that the disclosed device and method can be implemented in other ways. For example, the device embodiments described above are merely schematic, for example, the division of the described modules is only a logical functional division, and there may be other division way during actual implementation, for example, multiple modules may be combined or may be integrated into another system, or some features may be ignored, or not implemented. On another point, the mutual coupling or direct coupling or communication connection shown or discussed may be indirect coupling or communication connection through some interfaces, modules, which may be electrical, mechanical or other forms.

In the above specific implementation of the terminal device and the network device, it should be understood that the processor may be a Central Processing Unit (CPU), but also other general purpose processor, Digital Signal Processor (DSP), Application Specific Integrated Circuit (ASIC), etc. The general-purpose processor may be a microprocessor or the processor may also be any conventional processor, etc. The steps of the method disclosed in combination with present application may be directly embodied as being implemented and completed by a hardware processor, or being implemented and completed by a combination of hardware and software modules in the processor.

Implementation of all or some of the steps of each of the method embodiments described above may be accomplished by instructing related hardware by program. The aforementioned program may be stored in a readable memory. The program, when executed, performs the steps including each of the method embodiments described above; and the aforementioned memory (storage medium) includes: a read-only memory (ROM), a RAM, a flash memory, a hard disk, a solid state drive, a magnetic tape, a floppy disk, an optical disc and any combination thereof

What is claimed is:

1. A control device, comprising:
 a processor, a memory, and an interface communicating with other device;
 wherein the memory stores computer-executed instructions; and
 wherein the processor executes the computer-executed instructions stored in the memory, to cause the processor to:
 determine a first resource and a second resource, wherein the first resource and the second resource do not have an overlapping resource; and
 communicate with a first device via the first resource, and communicate with a second device via the second resource, wherein the second device comprises at least one of an energy harvesting module or a backscattering module,
 wherein the processor is further configured to:
 obtain a first resource set corresponding to the first device and a second resource set corresponding to the second device;
 use at least one resource in the first resource set as the first resource;
 use at least one resource in the second resource set as the second resource;
 wherein the first resource set comprises identifications of a plurality of resources available to the first device;
 wherein the second resource set comprises identifications of a plurality of resources available to the second device.

2. The control device according to claim 1, wherein the processor is further configured to:
 obtain control information during communication of the control device with the first device via a resource in a third resource set, wherein the control information is used for controlling the second device.

3. The control device according to claim 2, wherein the processor is further configured to:
 update the third resource set according to the second resource set to obtain the first resource set; so that the first resource set and the second resource set do not intersect.

4. The control device according to claim 1, wherein the processor is further configured to:
 send control information to the second device via the second resource;
 receive feedback information sent by the second device using a backscattering manner;
 wherein the feedback information is sent by the second device according to the control information.

5. The control device according to claim 4, wherein the processor is further configured to:
 transmit a continuous wave signal to the second device via a third resource before sending the control information;
 wherein the third resource is a resource in the second resource set;
 wherein the control information comprises a frequency of the continuous wave signal.

6. The control device according to claim 5, wherein the processor is further configured to:
 transmit the continuous wave signal via the third resource after sending the control information, until the receiving of the feedback information sent by the second device is completed.

7. The control device according to claim 4, wherein the processor is further configured to:
 update the first resource set to obtain a fourth second resource set after the receiving of the feedback information sent by the second device is completed; and
 send the fourth resource set to the first device.

8. The control device according to claim 7, wherein the processor is further configured to:
 add, by the control device, resources of the second resource set into the first resource set to obtain the fourth resource set.

9. The control device according to claim 4, wherein the control information is information encoded using a Manchester encoding manner.

10. The control device according to claim 4, wherein the control information is information modulated using at least one modulation manners, and the at least one modulation manner comprises: an Amplitude Shift Keying (ASK), a Frequency Shift Keying (FSK), or a Gaussian Frequency Shift Keying (GFSK).

11. The control device according to claim 4, wherein the processor is further configured to:
 upload the feedback information to a server or to the first device.

12. The control device according to claim 1, wherein the processor is further configured to:
 communicate with the first device via the first resource using frequency hopping.

13. The control device according to claim 1, wherein when a number of the first device is at least two, the processor is further configured to communicate with at least two first devices using the first resource set.

14. The control device according to claim 1, wherein the resource comprises at least one of a frequency domain resource or a time domain resource.

15. The control device according to claim 1, wherein the first resource set and the second resource set are subsets of a predefined resource set; the predefined resource set follows at least one of following communication protocols: a Bluetooth protocol, a wireless fidelity (WIFI) protocol, and a Zigbee protocol.

16. The control device according to claim 15, wherein when the communication protocol comprises the Bluetooth protocol, the Bluetooth protocol is a Bluetooth Low Power (BLE) protocol.

17. A first device, comprising:

a processor, a memory, and an interface communicating with other device;

wherein the memory stores computer-executed instructions; and wherein the processor executes the computer-executed instructions stored in the memory, to cause the processor to:

obtain a first resource set; wherein the first resource set is obtained by updating a third resource set according to a second resource set, and the second resource set is used by a control device to communicate with a second device;

determine a first resource according to the first resource set; and communicate with the control device via the first resource, wherein the first resource set comprises identifications of a plurality of resources available to the first device;

wherein the second resource set comprises identifications of a plurality of resources available to the second device.

18. The first device according to claim 17, wherein the first resource set does not intersect with the second resource set.

19. The first device according to claim 17, wherein the second device comprises at least one of an energy harvesting module or a backscattering module.

20. The first device according to claim 17, wherein the processor is specifically configured to:

communicating, by the first device, with a control device via the first resource using frequency hopping.

21. The first device according to claim 17, wherein the resource comprises at least one of a frequency domain resource or a time domain resource.

22. The first device according to claim 17, wherein the first resource set and the second resource set are subsets of a predefined resource set; the predefined resource set follows at least one of following communication protocols: a Bluetooth protocol, a wireless fidelity (WIFI) protocol, and a Zigbee protocol.

23. A second device, comprising:

a processor, a memory, and an interface communicating with other device;

wherein the memory stores computer-executed instructions; and wherein the processor executes the computer-executed instructions stored in the memory, to cause the processor to:

receive control information sent by a control device via a second resource; and send feedback information to the control device according to the control information using a backscattering manner, wherein the second resource is determined by the control device according to a second resource set corresponding to the second device;

wherein the second resource set comprises identifications of a plurality of resources available to the second device.

24. The second device according to claim 23, wherein the processor is further configured to:

receive a continuous wave signal transmitted by the control device via a third resource before receiving the control information sent by the control device via the second resource;

wherein the third resource is a resource in the second resource set; and the control information comprises a frequency of the continuous wave signal.

25. The second device according to claim 23, wherein the processor is further configured to:

receive a continuous wave signal transmitted by the control device via a third resource after receiving the control information sent by the control device via the second resource; and send the feedback information to the control device via the continuous wave signal using the backscattering manner.

* * * * *